(No Model.)
J. P. JOHANSON.
ELECTRIC WASHING MACHINE.
No. 512,970. Patented Jan. 16, 1894.
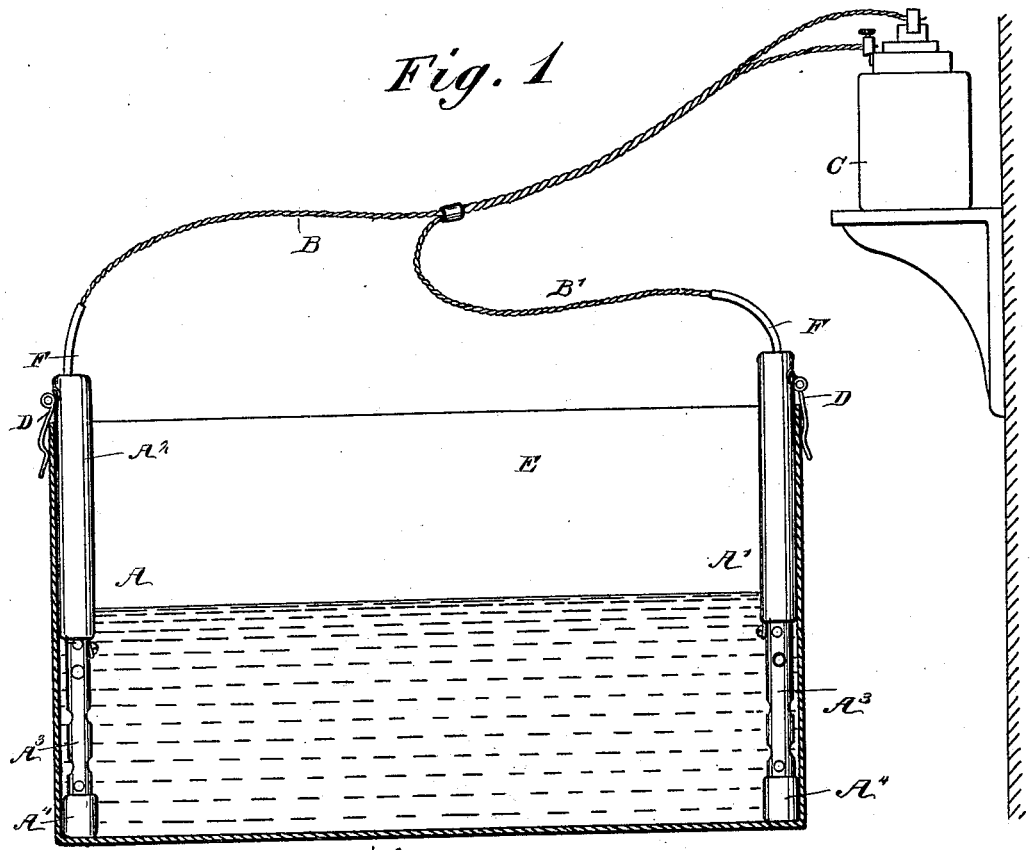
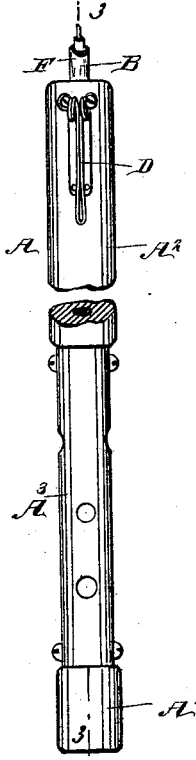
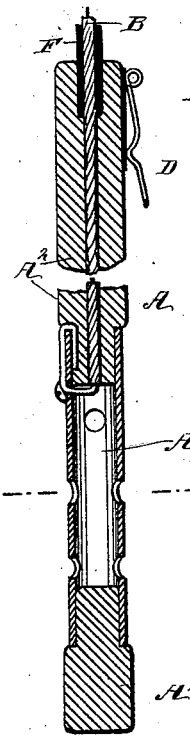
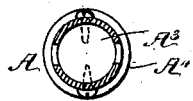
WITNESSES:
C. Neveux
C. Sedgwick
INVENTOR
J. P. Johanson
BY
Munn & Co.
ATTORNEYS.

UNITED STATES PATENT OFFICE.

JOHN P. JOHANSON, OF NEW YORK, N. Y.

ELECTRIC WASHING-MACHINE.

SPECIFICATION forming part of Letters Patent No. 512,970, dated January 16, 1894.

Application filed May 9, 1893. Serial No. 473,528. (No model.)

*To all whom it may concern:*

Be it known that I, JOHN P. JOHANSON, of the city, county, and State of New York, have invented a new and Improved Electric Washing-Machine, of which the following is a full, clear, and exact description.

The object of the invention is to provide a new and improved electric washing machine, which is simple and durable in construction, and arranged to properly remove the dirt from soiled linen, clothes, &c., in a very short time, and without injury to the fabric.

The invention consists of two electrodes connected with a source of electricity supply and formed each of an insulated handle provided with a catch for supporting the electrode on the wash boiler, a metallic perforated tube inserted in the said handle and connected with the conducting wire, and an insulated cap on the end of the tube opposite the handle.

The invention also consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1 is a side elevation of the improvement as applied, the wash boiler being shown in section. Fig. 2 is an enlarged side elevation of one of the electrodes. Fig. 3 is a longitudinal section of the same on the line 3—3 of Fig. 2; and Fig. 4 is a transverse section of the same on the line 4—4 of Fig. 3.

The improved electric washing machine is provided with two electrodes A and A' connected by the electric conducting wires B and B', with a suitable source of electricity supply, preferably a battery C, as plainly shown in Fig. 1. Each of the electrodes A or A' is provided with an insulated handle $A^2$, preferably made of wood and provided near its upper end with a suitable catch D adapted to engage the wall of the wash boiler E, so as to support the electrode on the latter, as illustrated in Fig. 1. The lower reduced end of the handle $A^2$ receives the upper end of a perforated metallic tube $A^3$ fastened in place on the handle by a set screw or other means, and the said tube is connected with the conducting wire B or B', respectively, which wire extends centrally through the handle $A^2$ and is insulated as indicated in Fig. 3, by passing through a rubber tube F, attached to the upper end of the handle $A^2$.

On the lower end of each metallic tube $A^3$ is secured a plug or cap $A^4$, adapted to rest on the bottom of the boiler E and against the side thereof, so as to hold the metallic tube $A^3$ out of contact with the metallic wall of the boiler E. See Fig. 1. The plug $A^4$ and handle $A^3$ are preferably of the same diameter, and considerably larger in diameter than the tube $A^3$, so as to prevent contact of the latter with the boiler E. The tube $A^3$ for each electrode is perforated so as to permit circulation of the water through the tube, to diffuse the electricity in the water held in the boiler.

In using this electric washing machine, the electrodes A and A' are attached to opposite sides of the boiler E, as plainly shown in the drawings, and the conducting wires B and B' are connected with the source of electricity supply.

The boiler E is filled partly with water and the clothes to be washed are placed in the said boiler, and then the boiler is heated in the usual manner, on a stove or other device, and when the water begins to boil, then the electricity is turned at the source of supply to cause a current of electricity to pass through the wires B and B', the electrodes A and A' and the water as the connecting medium. As the water is in circulation on account of boiling, the electricity is diffused in the water and comes in contact with the dirt, so as to loosen and dissolve the same without the least possible injury to the fabric. During the time the clothes are thus treated to an electric bath, the same are stirred occasionally. After a suitable time has elapsed, say about thirty minutes, then the current is turned off, the clothes are removed from the boiler, and rinsed in the usual manner, and then blued and dried in the usual manner. The dirt removed from the clothes in the boiler falls to the bottom thereof, and can be removed after the clothes have been taken out.

It will be seen that the electrodes A and A' can be readily and conveniently handled and moved about, and attached to the boiler, as above described and illustrated in Fig. 1.

I am aware that it is not new to utilize an electric current in water, for removing dirt from clothes, and I do not broadly claim this.

Having thus fully described my invention, I claim as new and desire to secure by Letters Patent—

1. An electric washing machine, comprising two electrodes connected with a source of electricity supply, each electrode comprising an insulating handle, a catch on the handle for attaching the electrode to the wash boiler, and a metallic perforated tube held on the said handle and connected with the conducting wire, substantially as shown and described.

2. An electric washing machine, comprising two electrodes connected with a source of electricity supply, each electrode comprising an insulating handle, a catch on the handle for attaching the electrode to the wash boiler, a metallic perforated tube held on the said handle and connected with the conducting wire, and an insulating plug or cap secured to the said tube opposite the handle, substantially as shown and described.

3. An electric washing machine, comprising two electrodes connected with a source of electricity supply, each electrode comprising a handle formed with a central aperture for the passage of the conducting wire, a metallic perforated tube secured on the said handle and connected with the conducting wire, and a cap made of an insulating material and secured to the end of the tube opposite the handle, the said handle and cap being larger in diameter than the said tube, substantially as shown and described.

4. An electric washing machine, comprising two electrodes connected with a source of electricity supply, each electrode comprising a handle formed with a central aperture for the passage of the conducting wire, a metallic perforated tube secured on the said handle and connected with the conducting wire, a cap made of an insulating material and secured to the end of the tube opposite the handle, the said handle and cap being larger in diameter than the said tube, and a catch held on the upper end of the handle to support the electrode on the wash boiler, substantially as shown and described.

JOHN P. JOHANSON.

Witnesses:
   THEO. G. HOSTER,
   EDGAR TATE.